March 10, 1953    M. H. SPIELMAN    2,631,251
METHOD OF ASSEMBLING AND STRUCTURE FOR MOTOR STATORS
Filed May 10, 1950    2 SHEETS—SHEET 1

INVENTOR.
MILTON H. SPIELMAN
BY Fay, Golrick & Fay
ATTORNEYS

March 10, 1953 M. H. SPIELMAN 2,631,251
METHOD OF ASSEMBLING AND STRUCTURE FOR MOTOR STATORS
Filed May 10, 1950 2 SHEETS—SHEET 2
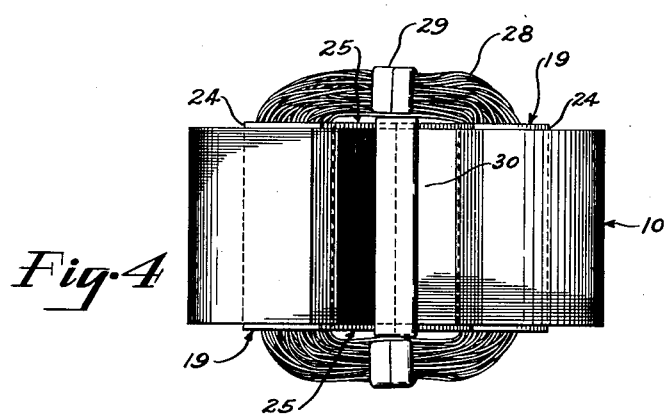
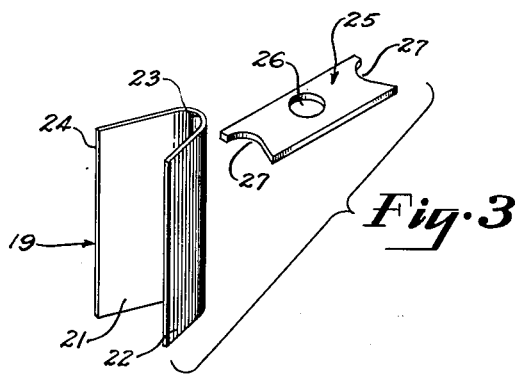
INVENTOR.
MILTON H. SPIELMAN
BY
Fay, Gobrick & Fay
ATTORNEYS Patented Mar. 10, 1953

2,631,251

UNITED STATES PATENT OFFICE 2,631,251

METHOD OF ASSEMBLING AND STRUCTURE FOR MOTOR STATORS

Milton H. Spielman, Cuyahoga Falls, Ohio, assignor to The Lamb Electric Company, Kent, Ohio, a corporation of Ohio Application May 10, 1950, Serial No. 161,077

4 Claims. (Cl. 310—215)

This invention relates to an improved method of assembling the stators of fractional horsepower motors and an improved structure for the same. It is the object of this invention to provide a new structure of the stator laminations and stator slot insulation in fractional horsepower motors which facilitates the assembly and coil winding in a deep slot type of core. Another object of the invention is to provide a means of mechanically supporting the slot insulation between coil and core to prevent splitting or tearing thereof. Another object is the provision of an insulation structure which will prevent mechanical failure of such insulation during winding with the consequent possibility of having the coil wire come in contact with the core with danger of grounding.

A further object of the invention is the provision of such a structure to reinforce the slot insulation which is more easily inserted and retained in place during assembly operations than previous structures. A still further object is the provision of an insulating structure in the space ordinarily left between the end of the stator coil and core wherein carbon or other brush residue might collect with danger of eventual shorting between coil and core.

In the method of assembly of fractional horsepower motors used in the prior art, prewound and formed coils, which have been taped with suitable insulating material, are forced into the slots provided for their reception in the laminated iron stator core. With the advent of the deep slotted type of stator core the use of such preformed coils was no longer possible and hence the skein or machine wound coils came into use. In the case of the smaller type of motor, inserts of insulating fiber or paper are placed in the stator slots to insulate the coil wire wound therein from contact with the laminated core. Generally these insulating paper or fiber inserts are somewhat longer than the axial length of the slot in order to space the coil ends from the metal core and particularly to prevent any contact of wire and core edge which could damage the wire insulation. However, during the winding process there is a tendency for the tensioned wire to tear through the paper so that it may come in contact with the sharp edge of the core slot, with attendant danger of abrasion or cutting through the insulation of the wire. Moreover, brush dust or other dust tends to gather in the space left between the end of the coil and the stator core, whereby eventual shorting of coil to core becomes possible.

The present invention supplies a means whereby the edges of the paper insulators are reinforced so that tearing becomes less likely and, in the event that it should occur, still effectively prevents the wire from coming in contact with the core. Another consequence of the practice of this invention is that in some methods of winding less attention need be given to careful regulation of the wire tensioning during winding. Also the present structure insulates the coil ends from the underlying core metal.

Further, in the assembling of the old type of coil structure the paper insulators tended to slip out of the slots and hence made some stages of the assembly and winding somewhat awkward. The type of core structure and insulators used in the practice of this invention provides a type of structure that makes the insulators self-holding once they are inserted in the slots even before the winding is begun.

Other objects and advantages of the invention will be apparent from the following detailed description of preferred forms of embodiment of the invention, reference being made to the accompanying drawings wherein—

Fig. 3 shows, in perspective, a preformed slot insulator and an end insulator used in this invention;

Fig. 4 is side view of a wound motor core.

Figure 1:
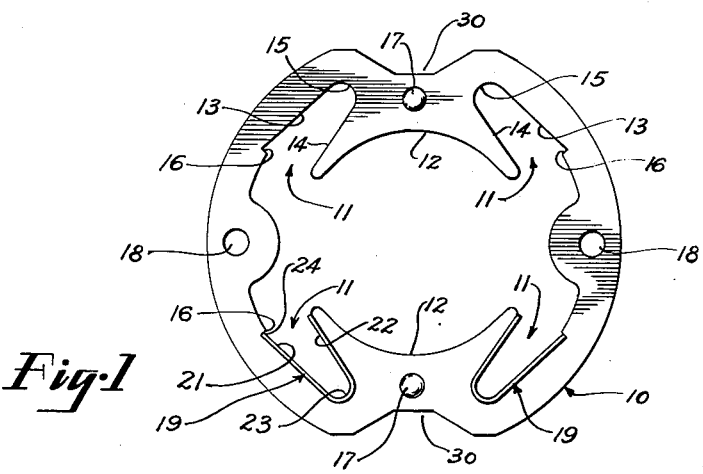
Fig. 1 is an end view of a motor stator core used in the practice of this invention, with slot insulators in place adjacent the bottom pole.
Figure 2:
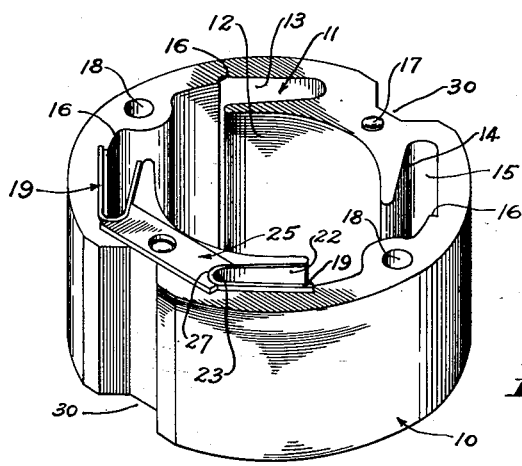
Fig. 2 shows, in perspective, the motor stator core of Fig. 1, with, however, an end insulator in position.

Fig. 1, an end view of a stator core 10 of this invention, serves also to show the shape of the laminations used. Both the shape of the lamination and the composite stator core structure are of the general form of that used in the prior art. However, the deep slots on either side of the pole 12 are wedge-shaped and have straight sides 13, 14 and arcuate bottoms 15, the outer walls or sides 13 of the slots terminating at a shoulder 16 about even with the edge of the pole face. These laminations are assembled in the usual fashion of the prior art and are bound together by rivets 17 to form the laminated structure of the stator core as shown in Figs. 1, 2 and 4. The holes 18 are provided to receive the motor frame bolts. The slot insulating strips 19 are preformed as shown in Fig. 3 to a general wedge or V-shape with straight sides 21, 22 and an arcuate fold 23 to fit into these slots. The outer side 21 of these insulating strips corresponds in length and shape to the length and shape of the coil slot from the shoulder 16 to the arcuate bottom 15 thereof. Usually the outer side 21 is somewhat longer than the inner side 22. These insulators are somewhat longer than the axial length of the slot as will be explained hereinafter. These slot insulators are simply slipped into the coil slot and the edge 24 of outer side 21 is snapped down alongside of the shoulder so that the insulator, by its natural resiliency, abuts against the shoulder and arcuate bottom of the slot whereby it is securely held in place and retained there during subsequent handling of the partially assembled stator structure. An end insulating strip 25, shown independently in Fig. 3, is placed between the ends of the slot insulators, which project beyond the stator core as shown in Figs. 2 and 4.

A hole 26 is provided in the end insulator to accommodate the head of the core rivet 17 so that the end insulator may rest flat on the stator core end. The ends 27 of the insulator are shaped to conform, when in position on the stator core, to that portion of slot insulators 19 against which they abut. The length of these end insulating strips between corresponding parts of the arcuate ends is somewhat longer than the distance between the corresponding parts of the curved bottoms of the coil slots in the core. Hence, when the end insulators are inserted between the projecting portions of the slot insulators, they displace the resilient insulators slightly and so are held by the elastic force of the insulators securely enough to retain them in place while the stator core is set up for hand or machine winding of the coil. To facilitate insertion of the end insulator, one end thereof is set in place against the slot insulator, and the inner side 22 of the other slot insulator is manually pushed inwardly from wall 14 of the slot, thereby drawing the curved portion 23 of the slot insulator away from the bottom 15 of the slot to allow the other end of the end insulator to be dropped in place. Upon release of the slot insulator to normal position, the end insulator is securely held in place. Preferably, the length of the slot insulators is greater than the axial length of the core slots by at least twice the thickness of the end insulators which are used. After all the slot end insulators have been put in place the stator core is ready for the coils to be wound thereon.

In the practice of this invention the "cuffed" type of slot insulators, in which the projecting ends of the insulator are rolled over or beaded outwardly to form an edge that is somewhat more resistant to tearing by wire during winding, may be used equally well. In this case, the length of the slot insulator should be such that the end insulators fit underneath the bead. However, in the practice of this invention, there is no need of using this more expensive cuff type of insulator since tearing of the insulator by the wire during winding cannot lead to shorting of the wire against the core, for the tearing usually can progress no further than the end insulator, and in any event the end insulator stops the wire before it can reach the core metal.

After the coil 28 (Fig. 4) has been wound into the stator slots, an insulated metal strip 29 is used to bind the ends of coil 28 and to pull these coil ends firmly toward the core. This strip 29 runs lengthwise in the groove or recess 30 in the side of the stator core, across the end insulators 25 under the ends of coil 28, and then around the ends of coil 28 to gather the coil wires together and restrain them from any endwise displacement. For ease of assembly, the band or strip 29 may be preformed to a suitable U-shape, so that the legs thereof may be inserted between the end insulators and the coil ends, the band pushed down into the groove 30, and then the band ends bent around the coil ends.

The method of assembly is then as follows: Laminations are formed in the shape described, and then assembled in the usual manner to produce a stator core of the structure described. The slot insulators are put in place and the end insulators are inserted. At this point the slot insulators are adjusted so that the two ends of each are projecting beyond the core slot equally and the manner of inserting the end insulators described in column 3, lines 27–43, inclusive, is preferably used. The stator core is next wound. Finally, the insulated core binding strip is put in place to tighten up the coil ends.

I claim:

1. In a stator for an electric motor, a stator core with coil slots having substantially flat side walls, one of said walls of each slot terminating at a shoulder near the longitudinal opening of the slot; a resilient slot lining insulator in each of said slots with the opposite ends thereof projecting from the slot ends, said slot insulator being conformed in shape to the interior of the slot and having one longitudinal edge abutting said shoulder; and an end insulator disposed between the projecting ends of each corresponding pair of slot insulators, said end insulator comprising an insulating strip having ends conformed in shape to the portions of the slot insulators against which they abut, the length of said strip exceeding slightly the span of the underlying stator core end, whereby during assembly the end insulator is retained in position, until the coils are wound on the stator.

2. In a stator for a fractional horsepower electric motor, a stator core with coil slots having substantially flat side walls and arcuate bottoms, the outer wall of each slot terminating at a shoulder near the longitudinal opening of the slot; a slot insulator of resilient strip material in each of said slots with the opposite ends thereof projecting from the slot ends, said slot insulator being conformed in shape to the interior of the slot and having one longitudinal edge abutting said shoulder; and an end insulator disposed between and abutting the projecting ends of each corresponding pair of slot insulators, said end insulator comprising an insulating strip having ends conformed in shape to the portions of the slot insulators against which they abut.

3. In a fractional horsepower electric motor of the type in which each pole is formed by an adjacent pair of coil slots in which a stator coil is wound, a stator core with coil slots having substantially flat side walls, each of said slots having a longitudinal shoulder formed near the slot mouth opposite the corresponding pole; a slot lining insulator in each of said slots and projecting from the opposite slot ends, said slot insulator being generally conformed in shape to the interior of the slot and having one longitudinal edge abutting said shoulder; and an end insulator disposed between and abutting the projecting ends of each corresponding pair of slot insulators, said end insulator comprising an insulating strip having ends conformed in shape to the projecting portions of the slot insulators against which said ends abut, said end insulator being slightly longer than the underlying stator core region between the slots of each pair.

4. In a fractional horsepower electric motor a stator which includes a core having a plurality of straight-walled, deep winding slots disposed in corresponding pairs to form stator poles therebetween, each said pair adapted to receive a winding for each pole; slot lining insulators each comprising an insulating strip generally conformed in shape to the slot and projecting longitudinally from each end thereof, said slot insulators being pre-formed of resilient material to be self-holding when inserted in the slots; and pole end insulators disposed across each pole end, each said end insulator being shaped to abut against the projecting ends of the corresponding pair of slot insulators and to be held thereby in position until the stator is wound.

MILTON H. SPIELMAN.

REFERENCES CITED

The following references are of record in the file of this patent:

UNITED STATES PATENTS

| Number | Name | Date |
|---|---|---|
| 565,647 | Thomson et al. | Aug. 11, 1896 |
| 1,292,551 | Wilson | Jan. 28, 1919 |
| 1,766,799 | Perkins | June 24, 1930 |
| 2,173,726 | Prindle | Sept. 19, 1939 |
| 2,232,812 | Studer | Feb. 25, 1941 |
| 2,506,850 | Wirth | May 23, 1950 |